US009712459B1

(12) United States Patent
White et al.

(10) Patent No.: US 9,712,459 B1
(45) Date of Patent: Jul. 18, 2017

(54) LOW-TO-HIGH SPEED CUT-THROUGH COMMUNICATION

(75) Inventors: Martin White, Sunnyvale, CA (US); Tsahi Daniel, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 65 days.

(21) Appl. No.: 13/014,611

(22) Filed: Jan. 26, 2011

Related U.S. Application Data

(60) Provisional application No. 61/298,837, filed on Jan. 27, 2010.

(51) Int. Cl.
*G08C 15/00* (2006.01)
*H04L 12/947* (2013.01)

(52) U.S. Cl.
CPC .................................... *H04L 49/25* (2013.01)

(58) Field of Classification Search
USPC ..... 370/395.3, 395.5, 395.51, 395.52, 395.6, 370/395.61, 419, 420, 421, 465–467, 474, 370/476
See application file for complete search history.

(56) References Cited

U.S. PATENT DOCUMENTS 5,307,345 A * 4/1994 Lozowick .............. H04L 12/46 370/428
5,784,559 A 7/1998 Frazier
6,076,062 A 6/2000 Van Steenbrugge
6,128,666 A * 10/2000 Muller et al. ................. 709/238
6,317,440 B1 * 11/2001 Sung ................. H04L 12/40058 370/505
6,529,957 B1 3/2003 Joergensen
6,542,581 B2 4/2003 Suonsivu et al.
6,791,942 B2 9/2004 Jin
6,920,132 B1 7/2005 Lo
6,938,097 B1 * 8/2005 Vincent ............... H04L 12/5693 370/238
6,975,637 B1 12/2005 Lenell
7,058,823 B2 6/2006 Lapidus
7,127,521 B2 10/2006 Hsu et al.
7,379,422 B2 5/2008 Nation
7,450,509 B2 11/2008 Hao
7,519,370 B2 4/2009 Febvre et al.
7,558,874 B1 7/2009 Kodukula et al.
7,664,972 B2 2/2010 Diab et al.
7,760,723 B1 * 7/2010 Daines et al. ................ 370/389
RE41,494 E * 8/2010 Ahern et al. .................. 710/300
(Continued)

FOREIGN PATENT DOCUMENTS

EP 1246398 10/2002
WO WO-2006052360 5/2006

OTHER PUBLICATIONS

“Amendment: Physical Layer and Management Parameters for 10 GB/s Operation—Type 10GBASE-T”, (2004), *LAN MAN Standards Committee of the IEEE Computer Society,* (2004) 145 pages.
(Continued)

*Primary Examiner* — Alvin Zhu

(57) ABSTRACT

This disclosure describes techniques and apparatuses enabling low-to-high speed cut-through communication without creating an overrun condition. By so doing, the techniques and/or apparatuses enable communication interfaces to communicate at higher speed, such as by avoiding store-to-forward latency.

20 Claims, 7 Drawing Sheets

100
110-1
110-2
110-3
110-4
Upstream Interface 120
106
Communication Interface 104
Communication Interface 104
Buffer 112
DMA 116
Controller 114
MAC 118
108-1
108-2
108-3
108-4
102

(56) References Cited

U.S. PATENT DOCUMENTS

| | | | |
|---|---|---|---|
| 7,826,360 | B1 | 11/2010 | Hutchison |
| 7,839,152 | B2 | 11/2010 | Lee et al. |
| 7,885,546 | B2 * | 2/2011 | Liu et al. .......... 398/98 |
| 8,009,574 | B2 | 8/2011 | Schenk |
| 8,401,014 | B2 * | 3/2013 | Capurso et al. .......... 370/392 |
| 8,670,335 | B2 | 3/2014 | Barkan et al. |
| 2002/0087716 | A1 * | 7/2002 | Mustafa .......... H04L 29/06 709/236 |
| 2004/0001508 | A1 * | 1/2004 | Zheng .......... H04L 12/4633 370/466 |
| 2004/0095935 | A1 * | 5/2004 | Connor .......... H04L 47/10 370/392 |
| 2005/0163117 | A1 * | 7/2005 | Rhim .......... H04L 45/06 370/389 |
| 2006/0023735 | A1 | 2/2006 | Sasson |
| 2006/0063498 | A1 | 3/2006 | Chan |
| 2006/0268733 | A1 | 11/2006 | Rhee et al. |
| 2007/0248118 | A1 | 10/2007 | Bishara et al. |
| 2008/0089433 | A1 | 4/2008 | Cho et al. |
| 2008/0123555 | A1 | 5/2008 | Qi et al. |
| 2008/0129118 | A1 | 6/2008 | Diab |
| 2008/0148081 | A1 | 6/2008 | Diab et al. |
| 2008/0172564 | A1 | 7/2008 | Diab et al. |
| 2008/0192631 | A1 | 8/2008 | Ardhanari et al. |
| 2008/0212485 | A1 | 9/2008 | Schenk |
| 2008/0219289 | A1 | 9/2008 | Harrison et al. |
| 2008/0225881 | A1 | 9/2008 | Powell |
| 2008/0310304 | A1 | 12/2008 | Edwards, III et al. |
| 2009/0154465 | A1 | 6/2009 | Diab et al. |
| 2009/0210725 | A1 | 8/2009 | Kim et al. |
| 2009/0252054 | A1 | 10/2009 | Barkan |
| 2010/0077239 | A1 | 3/2010 | Diab et al. |
| 2010/0262850 | A1 | 10/2010 | Lin et al. |
| 2011/0051620 | A1 | 3/2011 | Taich et al. |

OTHER PUBLICATIONS

"Non-Final Office Action", U.S. Appl. No. 12/193,519, (Mar. 29, 2010), 21 pages.
"Non-Final Office Action", U.S. Appl. No. 12/415,705, (Apr. 11, 2011), 27 pages.
"Notice of Allowance", U.S. Appl. No. 12/193,519, (Jun. 22, 2010), 6 pages.
"Part 3: Carrier Sense Multiple Access with Collision Detection (CSMA/CD) Access Method and Physical Layer Specifications", *IEEE Standards*, (Mar. 8, 2002), 10 pages.
"PCT Search Report", Application No. PCT/US2009/038989, (Jul. 3, 2009), 14 pages.
"U.S. Appl. No. 61/041,744", filed Apr. 2, 2008, 10 pages.
"Final Office Action", U.S. Appl. No. 12/415,705, (Nov. 22, 2011), 36 pages.
"Non-Final Office Action", U.S. Appl. No. 12/415,705, Feb. 20, 2013, 26 pages.
"Final Office Action", U.S. Appl. No. 12/415,705, (Jun. 25, 2013), 28 pages.
"Advisory Action", U.S. Appl. No. 12/415,705, Sep. 20, 2013, 2 pages.
"Notice of Allowance", U.S. Appl. No. 12/415,705, Oct. 15, 2013, 5 pages.
"Foreign Office Action", TW Application No. 98110958, Sep. 23, 2014, 13 Pages.
"Foreign Office Action", TW Application No. 98110958, Aug. 20, 2015, 8 Pages.

* cited by examiner

LOW-TO-HIGH SPEED CUT-THROUGH COMMUNICATION

RELATED APPLICATION

This application claims priority to U.S. Provisional Patent Application Ser. No. 61/298,837 filed Jan. 2, 2010, the disclosure of which is incorporated by reference herein in its entirety.

BACKGROUND

Unless otherwise indicated herein, the approaches described in this section are not prior art to the claims in this application and are not admitted to be prior art by inclusion in this section.

Data centers perform countless computing jobs for businesses and individual users. A modern data center, for example, may enable tens of thousands of individuals to browse the Internet or perform operations using extensive computational resources. To perform these duties, data centers often rely on communications between servers in the data center. Currently, interfaces responsible for communications between servers often store data of a packet when received and then, once all data of that data packet is stored, forwards the data packet. This technique, however, can be slow because of the latency inherent in waiting to forward a packet until the packet has been fully stored.

Another conventional technique may instead be used by the interfaces. This other technique begins to forward a packet prior to all data of that packet being stored. By so doing it can be faster than the store-and-forward technique noted above due to having a very low or zero latency. This other technique, however, is often slow as well because the technique cannot be used to forward packets received at lower-speed transmission rates at higher-speed transmission rates, as this causes an under-run condition due to the speed mismatch. When such a situation exists, the higher-speed transmission rates may go unused, causing slow communications between servers, or the transmitted packets may be corrupted.

SUMMARY

This summary is provided to introduce subject matter that is further described below in the Detailed Description and Drawings. Accordingly, this Summary should not be considered to describe essential features nor used to limit the scope of the claimed subject matter.

In one embodiment, a method is described comprising receiving packet streams at a lower-speed transmission rate, marking packets of the packet streams effective to indicate associations between the packets and the packet streams, and transmitting the marked packets of the packet streams in a cut-through mode, interleaved, and at a higher-speed transmission rate than the lower-speed transmission rate.

In another embodiment, a method is described comprising receiving, at a higher-speed transmission rate, marked packets, wherein the marked packets are interleaved, and wherein the marked packets associated with different packet streams having a lower-speed transmission rate, determining, based on a marking on each of the marked packets, to which of the different packet streams each marked packet is associated, and recreating each of the different packet streams based on which of the different streams each marked packets is associated with.

In still another embodiment, an apparatus is described having a buffer configured to buffer packets associated with packet streams having a lower-speed transmission rate, a controller configured to pull data from the buffer as each packet associated with each packet stream is buffered and mark each of the packets as said packet is buffered, the marking effective to indicate to which of the packet streams said packet is associated, and a media access controller configured to receive the marked packets and transmit the marked packets at a higher-speed transmission rate than the lower-speed transmission rate.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

As noted in the Background above, communication interfaces using conventional store-and-forward or cut-through communication techniques can be slow due to latency or an overrun condition, respectively. This disclosure describes techniques and apparatuses enabling low-to-high speed cut-through communication without creating an overrun condition. By so doing, the techniques and/or apparatuses enable communication interfaces to communicate at higher speed, such as by avoiding store-to-forward latency.

This discussion proceeds to describe an example operating environment in which the techniques may operate, methods performable by the techniques, and an example apparatus below.

Operating Environment

Figure 1:
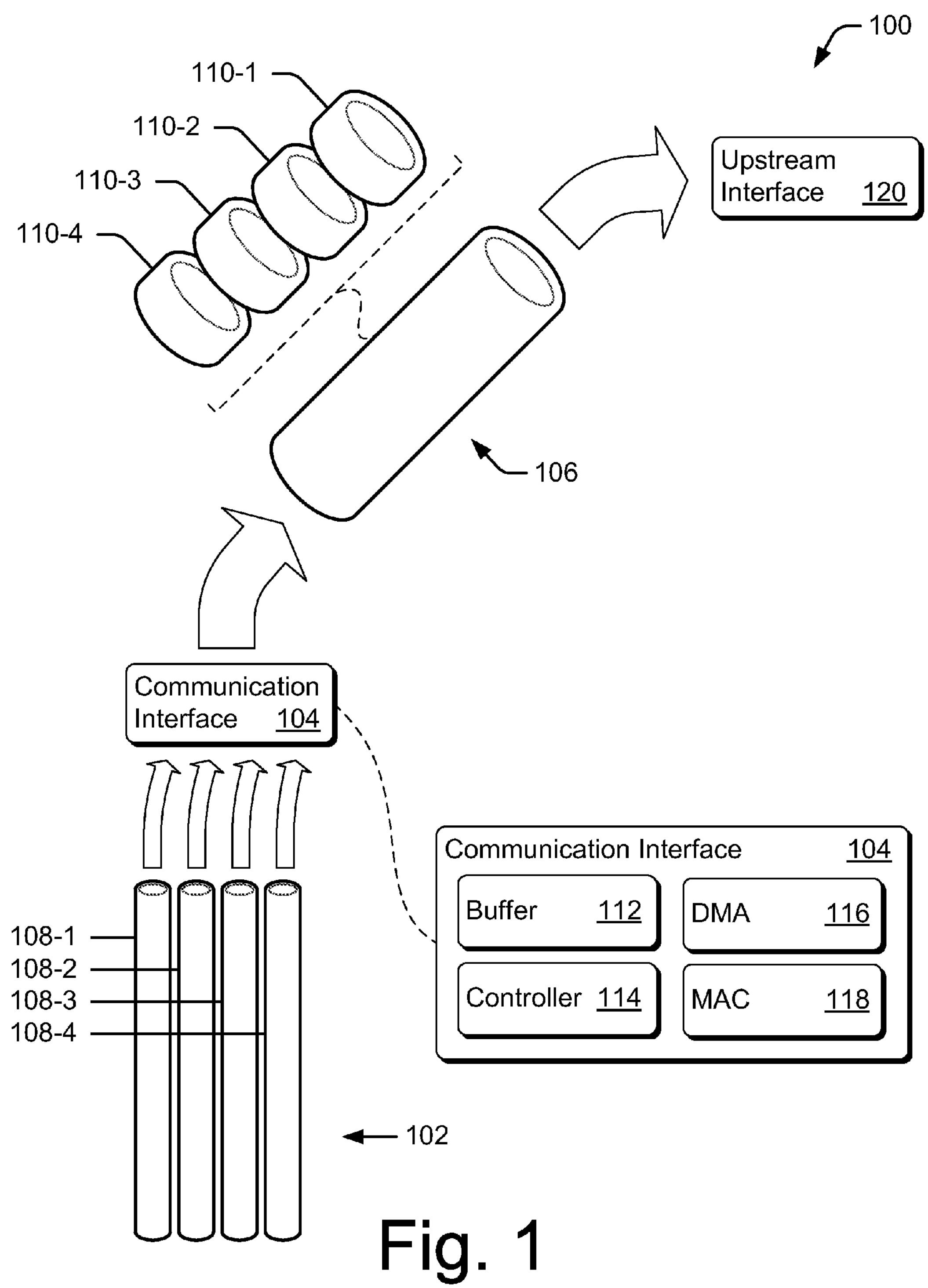
FIG. 1 illustrates an example environment in which techniques for low-to-high speed cut-through communication may operate.

FIG. 1 illustrates an example operating environment 100 having low-speed pipes 102, a communication interface 104, and a high-speed pipe 106. Low-speed pipes 102 enable transmission of packet streams at low-speed transmission rates, these low-speed packet streams are shown at 108-1, 108-2, 108-3, and 108-4. High-speed pipe 106 enables transmission of a packet stream at a high-speed transmission rate relative to the low-speed transmission rate of low-speed pipes 102. Communication interface 104 enables low-to-high speed cut-through communication, here shown receiving the four low-speed packet streams 108 and transmitting the packets of these streams interleaved and channelized at high-speed as channelized, high-speed packet streams 110-1, 110-2, 110-3, and 110-4, respectively, through high-speed pipe 106.

Communication interface 104 includes a buffer 112, an interface controller 114, a direct memory access module (DMA) 116, and a media access controller (MAC) 118. As will be described in greater detail below, communication interface 104 buffers data from packet streams 108 received a lower transmission rates, generally all at once. Controller 114, using DMA 116, accesses the data from buffer 112, marks the data such that the marked data can later be associated with its respective packet stream 108, and transmits the data at higher-speed transmission rates using MAC 118. Interface controller 114 can transmit the data from these lower-speed packet streams 108 in a cut-through mode, beginning to transmit data when packets of data are partially received. Note that the lower-speed transmission rates may or may not be equal or, when combined, sufficient to use all of the higher-speed transmission rate (e.g., pipes 102 may not equal pipe 106 or one or more of pipes 102 may not include a data stream).

By way of example, consider example environment 100 in the context of an Ethernet communication network. In this context, low-speed pipes 102 can be 10 gigabits/second pipes and high-speed pipe 106 a 40 or 100 gigabits/second pipe, while communication interface 104 is an Ethernet-capable interface.

Techniques for Low-to-High Speed Cut-Through Communication

The following section describes various techniques for low-to-high speed cut-through communication. Aspects of these techniques may be implemented in hardware, firmware, software, or a combination thereof. These techniques are illustrated in part using example methods, which are shown as acts that specify operations performed by one or more entities. These acts are not necessarily limited to the order shown or to entities performing them.

Figure 2:
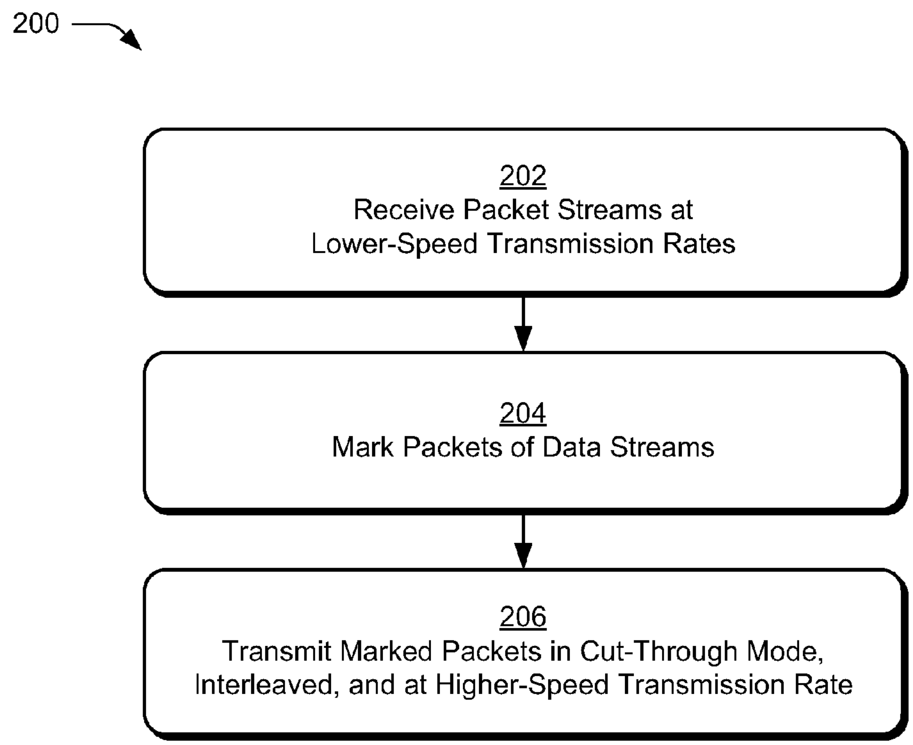
FIG. 2 illustrates a method for low-to-high speed cut-through communication focusing on actions of a communication interface.
Figure 3:
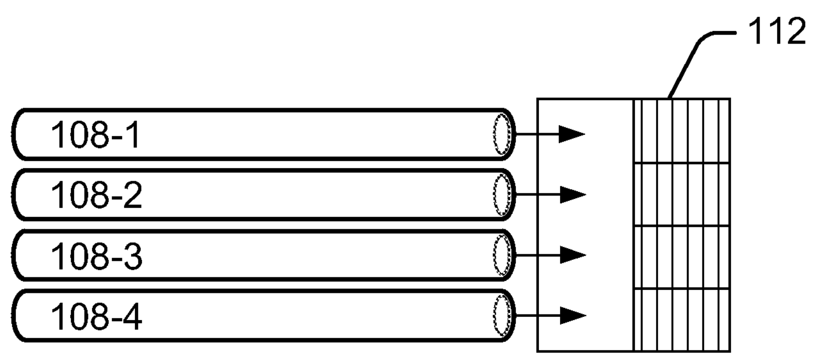
FIG. 3 illustrates buffering of packets of low-speed packet streams.

FIG. 2 illustrates a method 200 for low-to-high speed cut-through communication, which focuses on actions of communication interface 104. At 202, packet streams at lower-speed transmission rates are received. These packet streams can be received by communication interface 104, for example, and then buffered into buffer 112. This is shown in part in FIG. 3, which illustrates buffering of part, but not all, of packets from each of four packet streams 108.

At 204, packets of the packet streams are marked effective to indicate associations between packets and packet streams. This marking of the packets can be performed when each packet is partially received (and/or buffered) or at an end of a packet and after transmission has begun, or, if a received packet is to be transmitted in segments, at a beginning or end of each segment. In all of these cases, however, the markings enable an upstream entity to determine to which packet stream a packet is associated without prohibiting cut-through transmission of the packets.

Packets and portions of packets (if a received packet is segmented prior to transmission) can be marked in various ways and according to various communication protocols. In some cases, packets are segmented and identified with a context and these segments sent as a marked, segmented packet (either separately or combined) and following a particular protocol, such as an Institute of Electrical and Electronics Engineers (IEEE)-standard and complete packet. In such a case, multiple IEEE standard packets may be used to transmit the packet received at block 204, and in some cases other packets received as part of other packet streams 108. Segments of these IEEE-standard packets can later be re-assembled based on their markings. Manners in which an upstream entity may handle marked packets are covered hereinafter.

Continuing the ongoing example, communication interface 104 receives packets from low-speed packet streams 108 and through low-speed pipes 102 and buffers each packet into a dedicated compartment of buffer 112, after which DMA 116 pulls data from buffer 112 and controller 114 marks each packet with appropriate context sufficient to reassemble the packet stream from the marked packets.

At 206, the marked packets of the packets streams are transmitted in a cut-through mode, interleaved, and at a higher-speed transmission rate than the lower-speed transmission rate at which they were received. This is visually represented in FIG. 1 through high-speed, channelized packet streams 110 shown transmitted through high-speed pipe 106. As part of transmitting in a cut-through mode, controller 114 may begin transmission of the marked packets when partially received (whether transmitted in segments or otherwise), rather than wait to store all of the data of the packet first. As noted above, this reduces latency, which can speed up communications between computing devices (e.g., servers in a data center).

For some Ethernet packet streams, for example, method 200 segments a set of Ethernet packets from low-speed interfaces and interleaves these segments within a normal, outgoing Ethernet packet on a higher-speed port. Each segment of the Ethernet packets being sent out at the higher-speed port includes internal markings identifying the source of the segment. Thus, at 204, the markings mark each segment and indicate from which packet stream each segment originates. At 206, the marked segments are interleaved into an Ethernet packet and transmitted.

In some cases a number of packet streams received is insufficient to make full use of higher-speed transmission rates. Consider, for example, a case where three data streams 108 received, all at equal (10-gigabits/second) transmission rates but that the higher-speed transmission rate is 40 gigabits/second. In such a case controller 114 creates blank, marked packets and transmits these interleaved with marked packets of the three data streams 108. These marked, blank packets are marked sufficient to indicate that they are place holders rather than data for a data stream.

Figure 4:
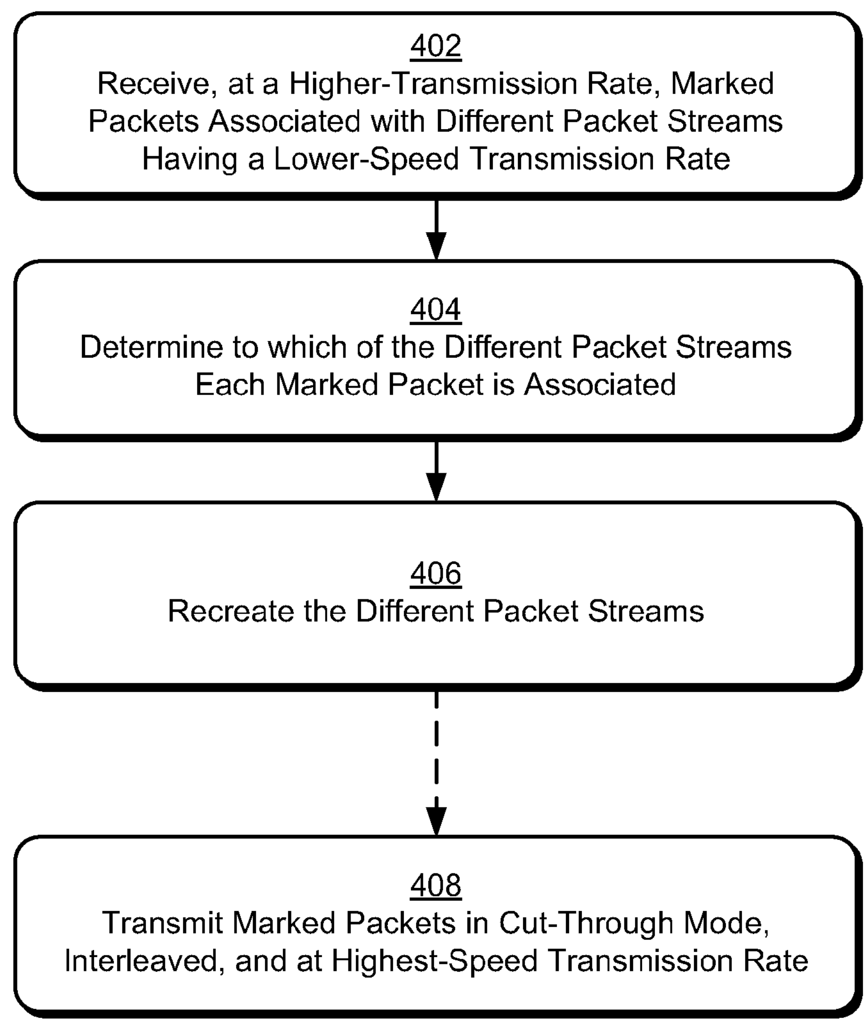
FIG. 4 illustrates a method for low-to-high speed cut-through communication focusing on actions of an upstream interface.

FIG. 4 illustrates a method 400 for low-to-high speed cut-through communication, which focuses on actions of an upstream interface. At 402, marked packets are received at a higher-speed transmission rate, the marked packets associated with different packet streams having a lower-speed transmission rate. These marked packets can be received interleaved. Thus, a marked packet associated with one packet stream can be received interleaved with packets of other packets streams. This is visually illustrated in FIG. 1 at high-speed, channelized packet streams 110. Each of these high-speed, channelized packet streams 110 are shown interleaved in a particular order, though a strict interleaving order is not necessarily required by the techniques.

Figure 5:
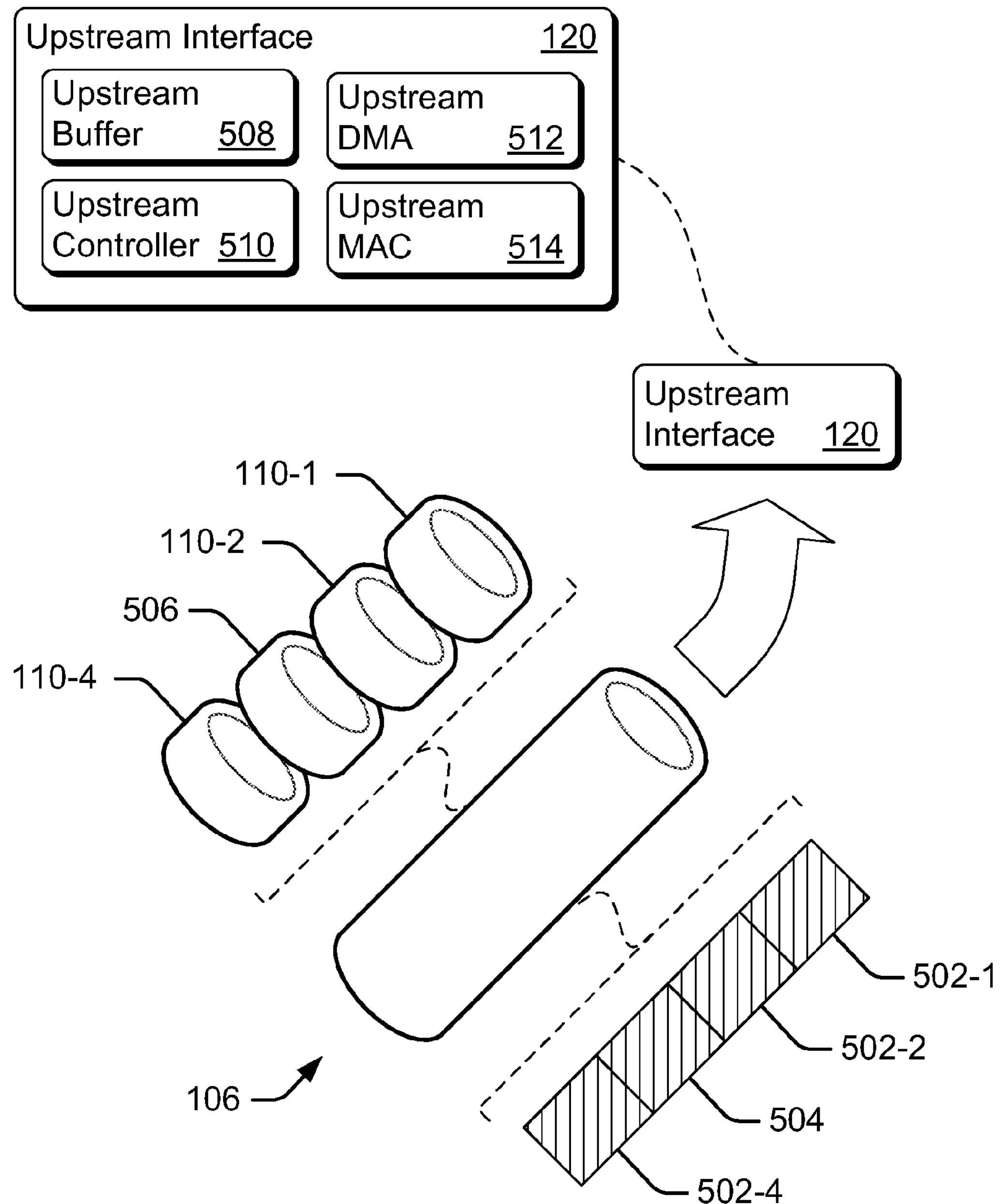
FIG. 5 illustrates example marked packets received by an upstream interface through a high-speed pipe and their respective channelized, high-speed packet streams.

By way of example, consider FIG. 5, which illustrates marked packets received by an upstream interface 120 through high-speed pipe 106, marked packets 502-1, 502-2, and 502-4 associated with three low-speed packet streams 108-1, 108-2, and 108-4 (shown in FIG. 1) and their three channelized, high-speed packet streams 110-1, 110-2, and 110-4, respectively. A channelized, high-speed packet stream 506 is also shown, which includes blank, marked packets, one of which is shown at 504. As noted above, blank marked packets can be used to make full use of high-speed pipe 106.

Upstream interface 120 can be dissimilar, similar, or identical to interface 104 of FIG. 1 (other than being upstream from interface 104). As shown in FIG. 5, upstream interface 120 includes an upstream buffer 508, an upstream controller 510, an upstream direct memory access module (DMA) 512, and an upstream media access controller (MAC) 514. Each of these entities can perform similarly to as set forth above. In this method 400, however, these entities act to receive marked packets and recreate packet streams to which they are associated, as well as other actions described below.

In this example, assume that marked packet 502-1 is received by upstream interface 120 at 40 gigabits/second and marked with a tag in a header to associate marked packet 502-1 with low-speed packet stream 108-1 (assume low-speed is 10 gigabits/second). Marked packet 502-1 is received first, followed immediately by marked packet 502-2, which is marked with a tag in a header to associate marked packet 502-2 with low-speed packet stream 108-2. Marked packet 502-1 is followed immediately by blank, marked packet 504, which is marked with a tag in a header to associate blank, marked packet 504 with no packet stream (thus, low-speed packet stream 108-3 is empty/does not exist). Following reception of blank, marked packet 504, marked packet 502-4 is immediately received, tagged in its header to associate marked packet 502 with low-speed packet stream 108-4.

Note that in some embodiments marked packets (e.g., 502-1, 502-2, and 502-4 and blank, marked packet 504) can be transmitted as a single Ethernet packet. In such a case, controller 114 marks segments of the data streams 108, after which MAC 118 transmits these segments within a single IEEE standard packet. Thus, the MAC 118 can act in a standard manner and without knowledge or interaction with the segments or their markings. In such a manner Ethernet MAC compliance can be maintained. This single Ethernet packet is received at block 402 having segments from multiple different packet streams 108. Each of these segments is marked sufficient to recreate these different packet streams 108.

At 404, it is determined to which of the different packet streams each marked packet (or its segment) is associated based on a marking on each of the marked packets. This can be determined by reading a tag in a header, a tag in some other portion of a marked packet, and/or other marking that provides appropriate context.

Continuing the ongoing example, assume that upstream interface 120 receives the packets at block 402 and buffers each marked packet in upstream buffer 122. After, before, or commensurate with buffering each market packet, upstream controller 510 reads the tag of each marked packet and determines to which low-speed packet stream 108 the packet belongs (if any). Thus, in this example upstream controller 510 determines that marked packet 502-1 is associated with low-speed packet stream 108-1, marked packet 502-2 is associated with low-speed packet stream 108-2, and marked packet 502-4 is associated with low-speed packet stream 108-4. Upstream controller 510 also determines that blank, marked packet 504 is not associated with a packet stream.

At 406, the different packet streams are recreated with data received in the marked packets. The techniques can recreate the different data streams in various ways, such as to read each marked packet as the marked packet is being received and/or buffered, stripping off the tag or other marking, and buffering either the data of the packet, the packet without the marking, or the marked packet as-is. The buffering can be made into a dedicated portion or section of a buffer or otherwise allocated to the appropriate lower-speed packet stream.

Continuing the ongoing example, assume that controller 510 of upstream interface 120 receives marked packets 502 and 504 as noted above, determines to which packet stream each belongs, if any, and in the case of marked packets 502, strips the tags from each header and buffers (using DMA 512) the now-unmarked packets in upstream buffer 508 in portions dedicated to the respective low-speed packet streams 108. In the case of blank, marked packet 504, upstream controller 510 discards the packet. This buffering is illustrated in FIG. 6, at 602 in upstream buffer 508.

Method 400 may continue at 408, at which packets of data streams are retransmitted, such as in a cut-through mode, interleaved, and at a highest-speed transmission rate higher than the higher-speed transmission rate. In some communication networks an interface, such as an Ethernet interface in an Ethernet communication network, transmits data at varying transmission speeds and through a hierarchy. Such an example network may include, for example, 10, 40, and 100 gigabits/second pipes.

Figure 6:
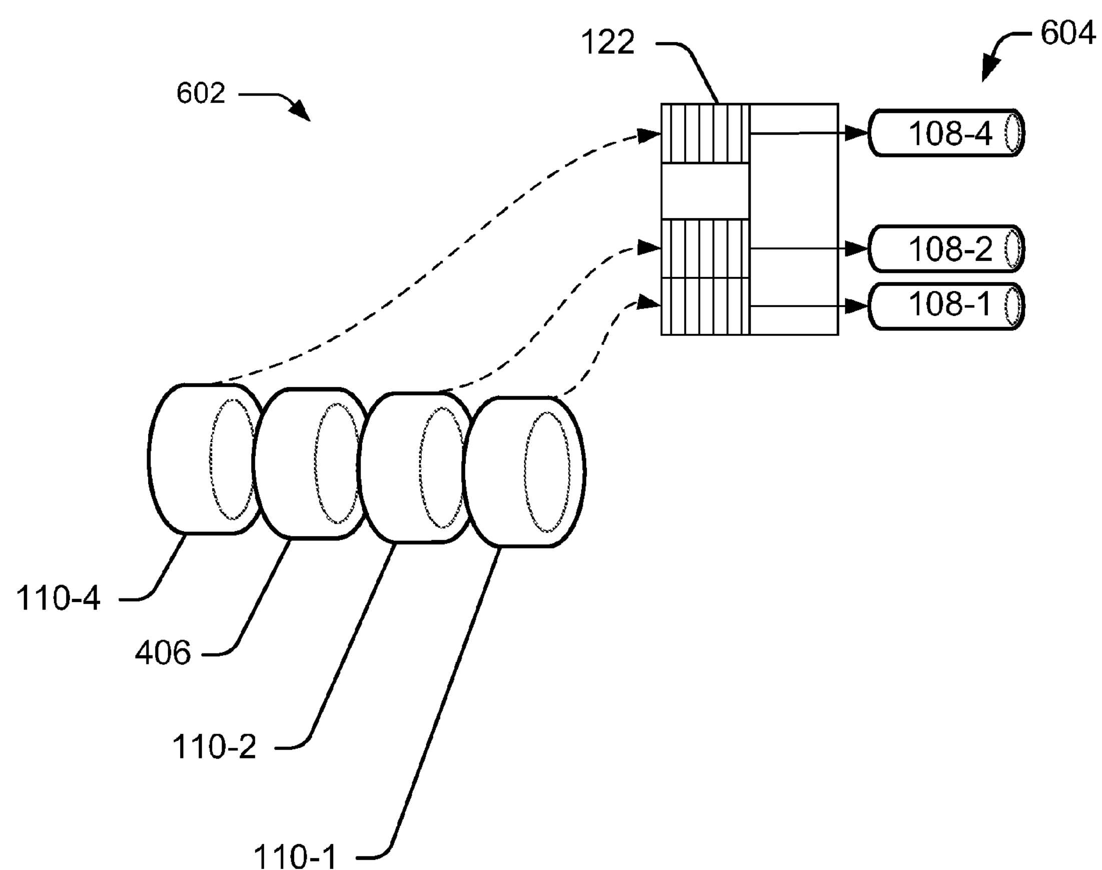
FIG. 6 illustrates buffering of packets received in channelized, high-speed packet streams into dedicated portions of an upstream buffer.

Continuing the ongoing example, assume that upstream interface 120 retransmits the three lower-speed packet streams shown in FIG. 6 along with seven other lower-speed packet streams (not shown) similarly to as performed at method 200. By so doing, the techniques transmit as many as 10, 10-gigabits/second data streams through a 100-gigabits/second pipe with little or no latency. This aids in many communications, such as server-to-server communications in data centers. If the packets are buffered as marked, upstream controller 510 may forgo marking the marked packets. If not, upstream controller 510 may mark the unmarked packets as described above. Thus, upstream DMA 512 accesses the data (marked and in packets or not) from buffer 508, upstream controller 510 marks each packet such that each packet can later be associated with its respective packet stream 108, and upstream MAC 514 transmits the marked packets at a highest-speed transmission rate (here 100 gigabits/second).

Alternatively, upstream interface 120 may transmit buffered packets through low-speed pipes, such as back to various servers or server-accessible memory. This is shown in FIG. 6 with low-speed packet streams 108-1, 108-2, and 108-4 transmitted through low-speed pipes 604, each of which here is a 10-gigabits/second pipe similar to low-speed pipes 102 of FIG. 1.

System-on-Chip Example

Figure 7:
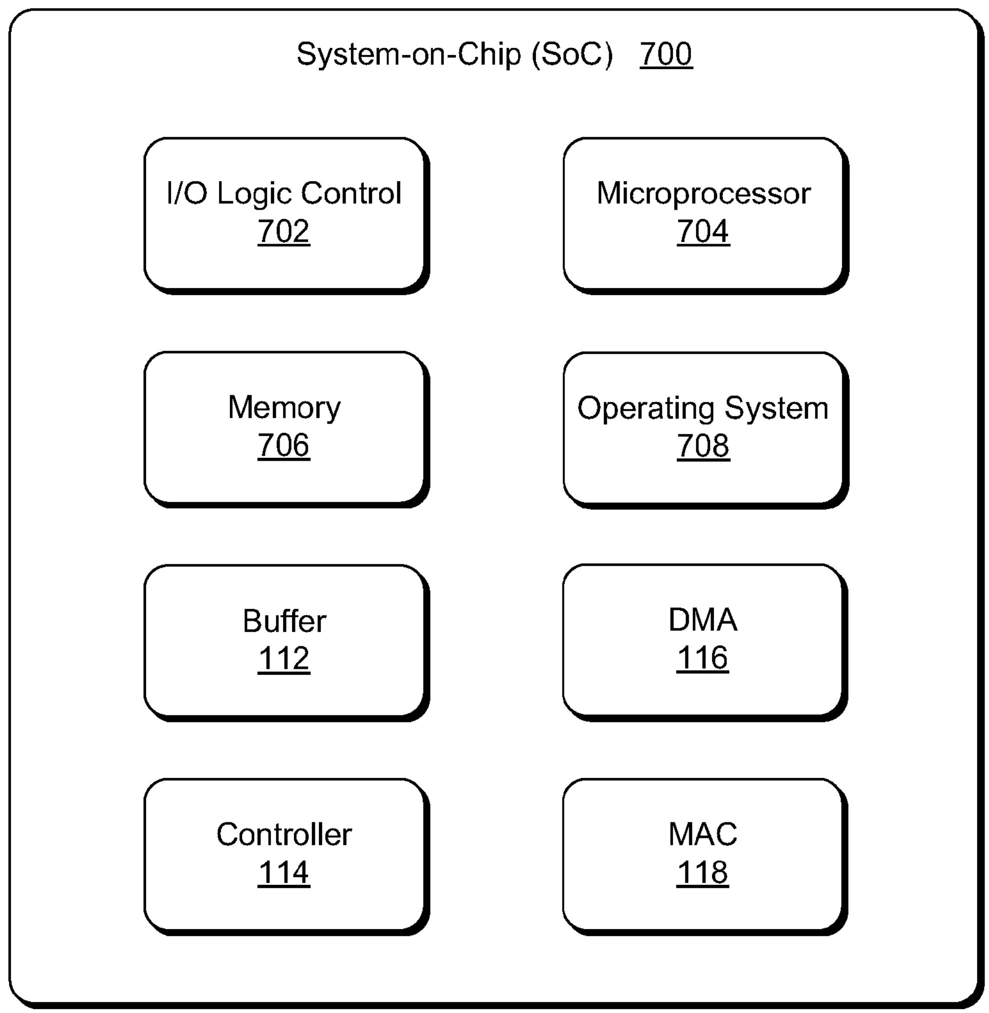
FIG. 7 illustrates an example system-on-chip (SoC) through which the techniques may be performed.

FIG. 7 illustrates an example System-on-Chip (SoC) 700, which can implement various embodiments of the techniques described above, including performing actions as part of an Ethernet interface or other communication interface to enable low-to-high speed cut-through communication. An SoC can be implemented in a fixed or mobile device, such as any one or combination of a computer device, television set-top box, video processing and/or rendering device, Ethernet interface, server, fabric switch, appliance device, gaming device, electronic device, vehicle, workstation, and/or in any other type of device that may transmit or receive packets in one or more packet streams.

SoC 700 can be integrated with electronic circuitry, a microprocessor, memory, input-output (I/O) logic control, communication interfaces and components, other hardware, firmware, and/or software needed to run an entire device. SoC 700 can also include an integrated data bus (not shown)

that couples the various components of the SoC for data communication between the components. A device that includes SoC 700 can also be implemented with many combinations of differing components.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of random access memory (RAM), a low-latency nonvolatile memory (e.g., flash memory), read only memory (ROM), and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, wireless LAN (WLAN) or PAN (WPAN) components, other hardware, firmware, and/or software.

SoC 700 may include controller 114 of FIG. 1, as well as buffer 112 (which may be part of memory 706), DMA 116, and/or MAC 118. Examples of these various components, functions, and/or entities, and their corresponding functionality, are described with reference to the respective components of the example environment 100 shown in FIG. 1 or similar entities shown in FIG. 5 as part of upstream interface 120. Note that one or more of the entities shown in FIG. 7, as well as FIGS. 1, 3, 5, and 6, may be further divided, combined, and so on. Each of these entities can be hardware, software, firmware, or a combination thereof, and/or stored on computer-readable-media and executed by one or more processors.

Controller 114 in SoC 700, either independently or in combination with other entities, can be implemented as computer-executable instructions maintained by memory 706 and executed by microprocessor 704 to implement various embodiments and/or features described herein. Controller 114 may also be provided integral with other entities of the SoC, such as integrated with DMA 116. Alternatively or additionally, controller 114 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. A method comprising:

receiving packet network streams at a lower-speed transmission rate;

marking packets of the packet network streams effective to indicate associations between the packets and the packet network streams; and transmitting the marked packets of the packet network streams in a cut-through mode, interleaved at the packet level, and in a higher-speed packet level interleaved network stream at a transmission rate greater than the lower-speed transmission rate, the cut-through mode initiating transmission of the marked packets through the higher-speed packet level interleaved network stream when the packets from the packet network streams are partially received.

2. The method of claim 1, wherein:

marking the packets includes marking the packets when partially received; and transmitting the marked packets in the cut-through mode such that an upstream entity can determine with which of the packet network streams the packet is associated without prohibiting the cut-through transmission of the packets.

3. The method of claim 1, wherein marking the packets of the packet network streams includes adding a tag to an existing header in the packets, and wherein the packet network streams are Ethernet packet streams.

4. The method of claim 1, wherein marking the packets of the packet network streams includes marking segments of each of the packets, each of the markings of the segments indicating to which packet network stream each segment is associated.

5. The method of claim 1, wherein:

a number of the packet network streams received is insufficient to make full use of the higher-speed packet network stream; and the method further comprises packet level interleaving blank, marked packets sufficient to make full use of the higher-speed packet level interleaved network stream.

6. The method of claim 1, wherein the packet network streams include four packet network streams, the lower-speed transmission rate is 10 gigabits/second, and the transmission rate of the higher-speed packet level interleaved network stream is 40 gigabits/second.

7. The method of claim 1, wherein the method is performed by an Ethernet switch having an interface controller, the interface controller segmenting the packets of the packet network streams and interleaving the segments of the packets into an IEEE standard packet for transmission in the higher-speed packet level interleaved network stream.

8. A method comprising:

receiving, in a higher-speed packet level interleaved network stream, marked packets, wherein the marked packets are interleaved at the packet level, and wherein the marked packets associated with different packet network streams have a lower-speed transmission rate than a higher-speed transmission rate of the higher-speed packet level interleaved network stream;

determining, based on a marking on each of the marked packets, to which of the different packet network streams each marked packet is associated;

removing markings from each of the marked packets; and recreating each of the different packet network streams based on which of the different streams each of the unmarked packets is associated.

9. The method of claim 8, wherein determining to which of the different packet network streams each marked packet is associated includes reading multiple markings within each marked packet, each of the multiple markings on a segment within each marked packet and indicating to which of the different data streams each segment is associated.

10. The method of claim 8, wherein determining to which of the different packet network streams each marked packet is associated includes reading a tag in a header of each of the marked packets.

11. The method of claim 8, further comprising retransmitting the marked packets of the packet network streams in a cut-through mode, interleaved at the packet level, and at a highest-speed transmission rate, the highest-speed transmission rate higher than the higher-speed transmission rate.

12. The method of claim 11, wherein:

the packet network streams include four packet network streams, the lower-speed transmission rate is 10 gigabits/second, the higher-speed transmission rate is 40 gigabits/second, the highest-speed transmission rate is 100 gigabits/second, and the method further comprises interleaving at the packet level the marked packets of the four packet network streams with six other packet network streams also received at the lower-speed transmission rate.

13. The method of claim 8, further comprising receiving blank, marked packets, and discarding the blank, marked packets.

14. The method of claim 8, wherein the packet network streams are Ethernet packet streams and the method is performed by an Ethernet interface having an interface controller.

15. The method of claim 8, wherein the method further comprises transmitting each of the recreated different packet network streams by a media access controller (MAC).

16. The method of claim 8, wherein the higher-speed packet level interleaved network stream is received in a cut-through mode such that the marked packets are partially received prior to determining to which of the different packet network streams each marked packet is associated, removing the markings from the packets, and initiating the recreation of the different packet network streams.

17. A System-on-Chip (SoC) comprising:

a buffer configured to buffer packets associated with packet network streams having a lower-speed transmission rate;

a controller configured to pull data from the buffer as each packet associated with each packet network stream is buffered, and mark each of the packets as said packet is buffered, the marking effective to indicate to which of the packet network streams said packet is associated; and a media access controller (MAC) configured to receive the marked packets, and transmit the marked packets, in a cut-through mode, interleaved at the packet level, and at a higher-speed transmission rate in a higher-speed packet level interleaved network stream, the higher-speed transmission rate greater than the lower-speed transmission rate, the cut-through mode initiating transmission of the marked packets through the higher-speed packet level interleaved network stream when the packets from the packet network streams are partially received.

18. The SoC of claim 17, wherein the controller is further configured to pass multiple packets to the MAC at one time, the multiple packets including one of the marked packets for each of the packet network streams.

19. The SoC of claim 17, wherein the controller includes a direct memory access (DMA) device configured to pull the data from the buffer.

20. The SoC of claim 17, wherein the packet network streams are Ethernet packet streams; and the interleaving comprises interleaving the marked packets into an IEEE standard packet for transmission in the higher-speed packet level interleaved network stream.

* * * * *